United States Patent [19]
Furlani et al.

[11] Patent Number: 6,067,183
[45] Date of Patent: May 23, 2000

[54] LIGHT MODULATOR WITH SPECIFIC ELECTRODE CONFIGURATIONS

[75] Inventors: Edward P. Furlani, Lancaster; William J. Grande, Pittsford; Thomas M. Stephany, Churchville, all of N.Y.

[73] Assignee: Eastman Kodak Company, Rochester, N.Y.

[21] Appl. No.: 09/208,563

[22] Filed: Dec. 9, 1998

[51] Int. Cl.[7] ........................................................ G02F 1/03
[52] U.S. Cl. ........................... 359/254; 359/230; 359/291; 359/290; 348/203; 345/108
[58] Field of Search .................... 359/290, 254, 359/230, 224, 227, 291, 572, 293; 348/203; 345/48, 108

[56] References Cited

U.S. PATENT DOCUMENTS

| | | | |
|---|---|---|---|
| 4,298,247 | 11/1981 | Michelet et al. | 359/291 |
| 4,488,784 | 12/1984 | Kalt et al. | 359/290 |
| 4,786,149 | 11/1988 | Hoening et al. | 359/291 |
| 5,233,459 | 8/1993 | Bozler et al. | 359/230 |
| 5,311,360 | 5/1994 | Bloom et al. | 359/572 |
| 5,677,783 | 10/1997 | Bloom | 359/224 |
| 5,768,009 | 6/1998 | Little | 359/293 |
| 5,781,331 | 7/1998 | Carr et al. | 359/291 |
| 5,784,189 | 7/1998 | Bozler et al. | 359/254 |
| 5,926,309 | 7/1999 | Little | 359/293 |

*Primary Examiner*—Loha Ben
*Attorney, Agent, or Firm*—Raymond L. Owens

[57] ABSTRACT

A light modulator for modulating a beam of light of wavelength λ including a substrate, a fixed electrode formed over the substrate and arranged to reflect light; an insulative transparent layer defining a modulating region formed over the fixed electrode wherein the height of the insulative transparent layer is substantially an odd multiple of $\lambda/n4$, where n is the refractive index of the insulative transparent layer; the plurality of electrodes having a coiled portion disposed adjacent to the modulating region and effective in a first configuration wherein the coiled portion remains coiled and in a second flat configuration in response to a voltage applied between the plurality of electrodes and the fixed electrode for uncoiling the coiled portion so that it is in the second flat configuration over the modulating region; a top surface of the plurality of electrodes being made of a reflective material; and applying a voltage across the plurality of electrodes and the fixed electrode to uncoil the coiled portion so that it is in the second flat configuration and its top surface is arranged to reflect light illuminating the modulating region so that light reflected from the top surface of the plurality of electrodes interferes with the light reflected from the fixed electrode to modulate the light which illuminates the light modulating region.

8 Claims, 3 Drawing Sheets

LIGHT MODULATOR WITH SPECIFIC ELECTRODE CONFIGURATIONS

FIELD OF THE INVENTION

This invention relates to light modulators and more particularly to specific configurations of electrodes usable in such light modulators.

BACKGROUND OF THE INVENTION

Advances in micromachining technology have given rise to a variety of micro-electromechanical systems (MEMS) including light modulators for low cost display applications. Such modulators provide high-resolution, high operating speeds (KHz frame rates), multiple gray scale levels, color adaptability, high contrast ratio, and compatibility with VLSI technology. One such modulator has been disclosed in U.S. Pat. Nos. 5,311,360 and 5,677,783 by Bloom et al. This modulator is a micromachined reflective phase grating. It includes a plurality of deformable elements in the form of beams suspended at both ends above a substrate. The deformable elements have a metallic layer that serves both as an electrode and as a reflective surface for incident light. The substrate is also reflective and contains a separate electrode. The deformable elements are disposed so that in an unactivated state light reflected off of the deformable elements has a phase relationship of $m\lambda$ with light reflected off of the substrate, where m is an integer and $\lambda$ is the wavelength of the incident light. Thus, in an unactivated state the modulator operates substantially like a mirror and the incident light beam is reflected. The deformable elements are activated by applying a voltage between the deformable elements and the substrate electrode, electrostatically drawing the deformable elements closer to the substrate. In a preferred embodiment, when the modulator is activated light reflected from the deformable elements has a phase relationship of $p\lambda/2$ with light reflected off of the substrate electrode, where p is an odd integer. In the activated state the modulator operates substantially as a reflective phase grating and the incident light beam is diffracted. Optical systems can intercept the diffracted light with output occurring only when the deformable elements are activated. For display applications, a number of deformable elements are grouped for simultaneous activation thereby defining a pixel, and arrays of such pixels are used to form an image. Furthermore, since gratings are inherently dispersive, this modulator can be used for color displays by appropriately altering the grating pitch.

Another MEMS light modulator has been disclosed in U.S. Pat. Nos. 5,233,459 and 5,784,189 by Bozler et al. This modulator comprises a plurality of moveable, reflective electrodes which are disposed on a transparent substrate containing a transparent electrode. In an unactivated state the electrodes are in a curled configuration adjacent to and unobstructive of a modulating region. In this unactivated state incident light passes through the substrate beneath the modulating region without reflection. The modulator is activated by applying a voltage between the moveable electrodes and the transparent substrate electrode, which electrostatically draws the moveable electrodes towards the substrate causing them to uncurl into a flat configuration over the modulating region. In the activated state the modulator behaves substantially like a mirror and the incident light is reflected from the modulating region. The modulator of Bozler et al is completely reflective in nature and stands distinct from the device disclosed by Bloom et al which is diffractive.

For many applications, particularly those requiring color, a diffractive light modulator is advantageous. One problem with the device disclosed by Bloom et al is device reliability. In a preferred embodiment the deformable elements contact the substrate in their activated state and have a tendency to stick. Additionally, the deformable elements tend to acquire a charge after a period of operation which electrostatically draws the elements toward the substrate and gives rise to a false activated state. Both of these problems are accentuated because the beams that make up the deformable elements have small restoring spring forces. It would be advantageous to produce a diffractive light modulator that operates substantially like the device of Bloom et al but has greater device reliability.

SUMMARY OF THE INVENTION

It is an object of the present invention to provide an improved modulator for diffractively modulating an incident beam of light by providing specific electrode configurations that increase device reliability.

The object is achieved in a light modulator for modulating a beam of light of wavelength $\lambda$ comprising;

(a) a substrate;

(b) a fixed electrode formed over the substrate and arranged to reflect light;

(c) an insulative transparent layer defining a modulating region formed over the fixed electrode wherein the height of the insulative transparent layer is substantially an odd multiple of $\lambda/n4$, where n is the index of refraction of the insulative transparent layer;

(d) a plurality of electrodes having a coiled portion disposed adjacent to the modulating region and effective in a first configuration wherein the coiled portion remains coiled and in a second flat configuration in response to a voltage applied between the plurality of electrodes and the fixed electrode for uncoiling the coiled portion so that it is in the second flat configuration over the modulating region;

(e) a top surface of the plurality of electrodes being made of a reflective material; and (f) means for applying a voltage across the plurality of electrodes and the fixed electrode to uncoil the coiled portion so that it is in the second flat configuration and its top surface is arranged to reflect light illuminating the modulating region so that light reflected from the top surface of the plurality of electrodes interferes with the light reflected from the fixed electrode to modulate the light which illuminates the light modulating region.

An advantage of the present invention is that the coiled portion after being disposed in its uncoiled configuration will readily return to its coiled configuration since the stress in the coil can be selected to provide a large restoring force.

A feature of the light modulator of the invention is that by using a plurality of electrodes with a coiled portion the modulating region can be readily changed from an unmodulated to a modulated state by the simple application of voltage across the plurality of electrodes and the fixed electrode.

DETAILED DESCRIPTION OF THE PREFERRED EMBODIMENTS

Figure 1:
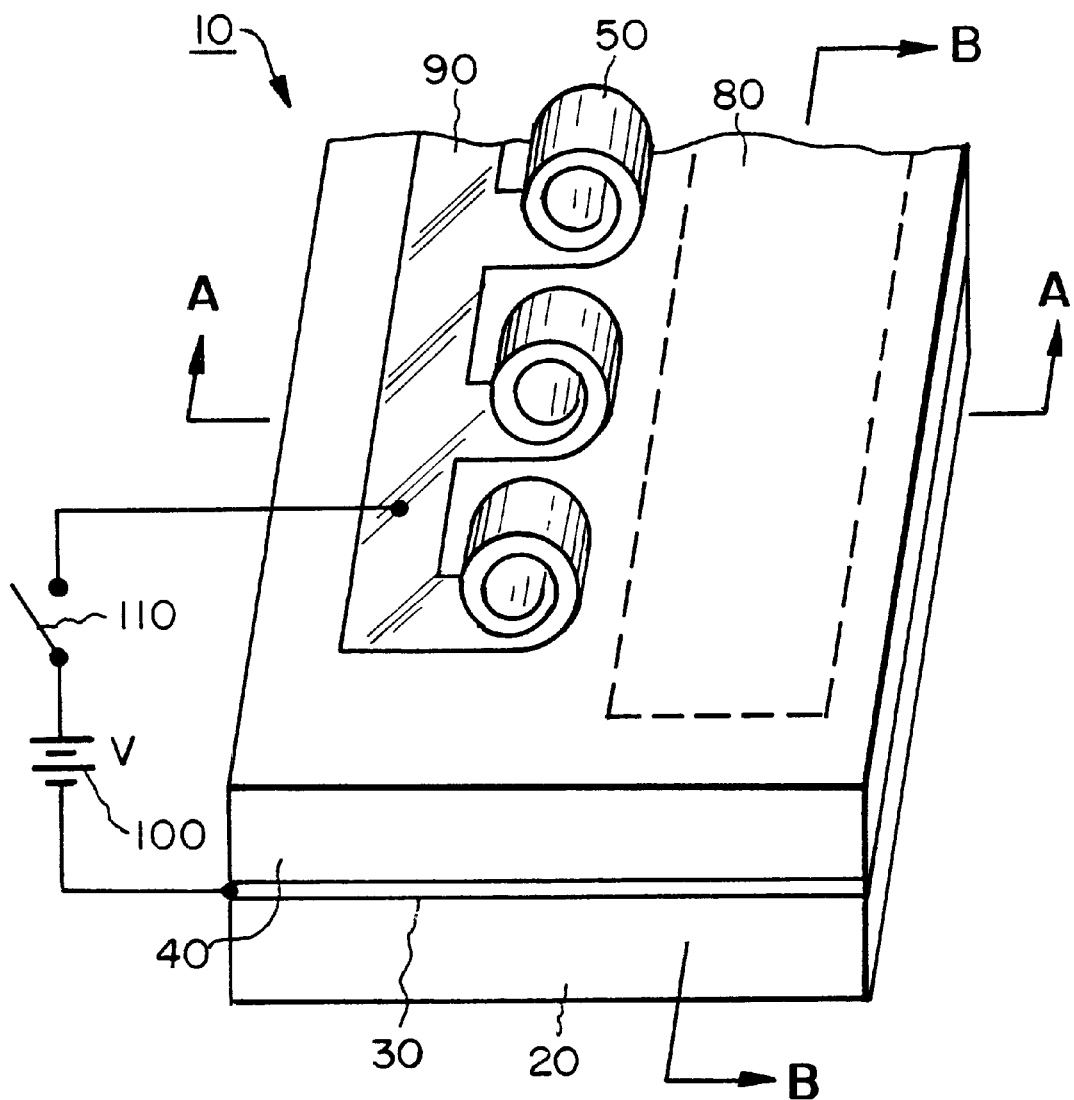
FIG. 1 is a perspective partially cut-away view of a modulator of the invention.

Referring to FIG. 1, a light modulator 10 in accordance with the invention is shown. The light modulator 10 includes a substrate 20, a fixed electrode 30 deposited on the top surface of the substrate 20, an insulative transparent layer 40 deposited on the top surface of the fixed electrode 30, and a plurality of electrodes 50 attached to the top surface of the insulative transparent layer 40 for modulating light incident upon a modulating region 80. A power source 100 is connected via a switch 110 to a conductive pad 90 as shown, thereby permitting the application of a voltage or potential between the plurality of electrodes 50 and the fixed electrode 30 when the switch 110 is closed.

Figure 2:
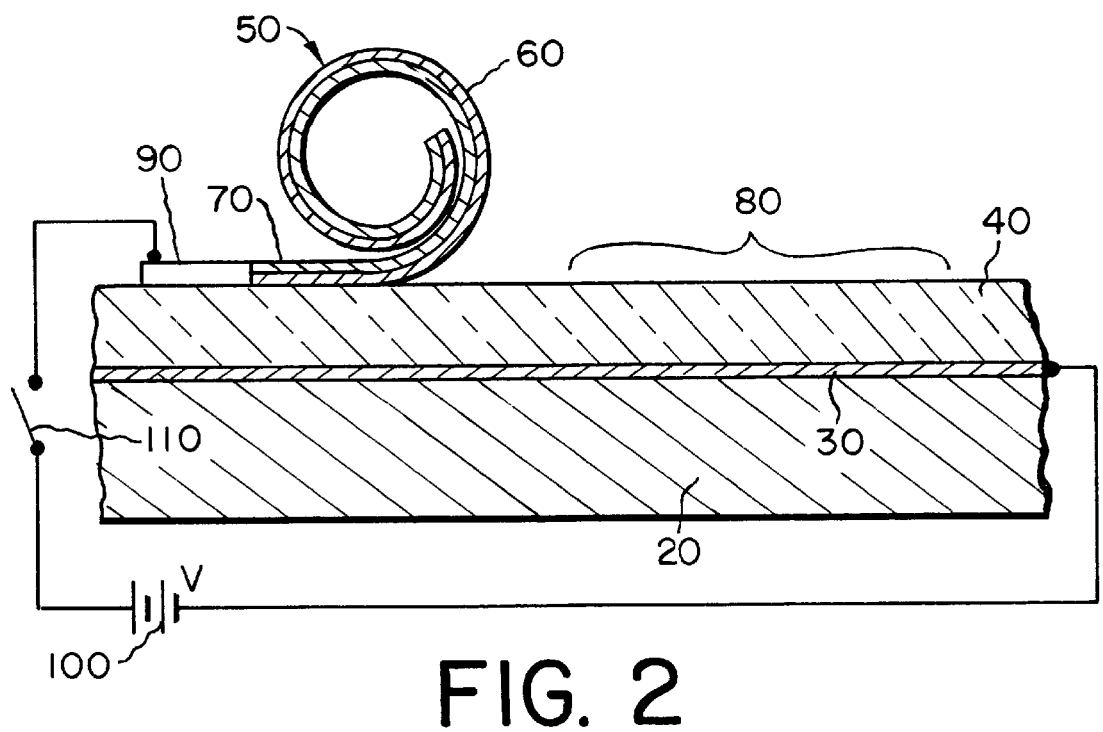
FIG. 2 is a sectional view of the modulator of FIG. 1 taken along line A—A of FIG. 1 wherein the plurality of electrodes are in a first configuration.
Figure 3:
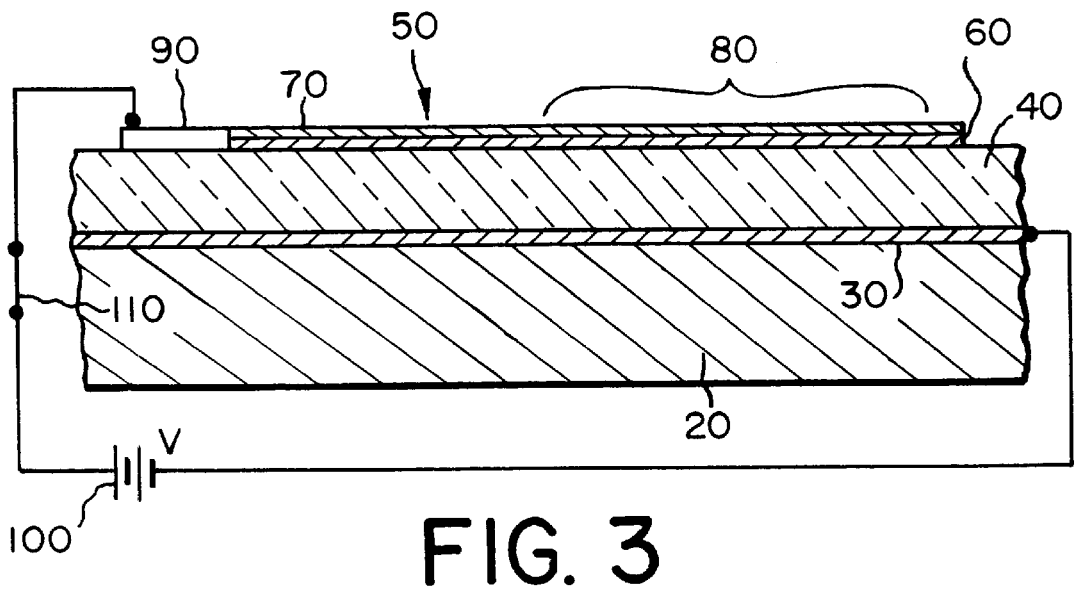
FIG. 3 is a sectional view of the modulator of FIG. 1 taken along line A—A wherein the plurality of electrodes are in a second flat configuration.

Referring now to FIGS. 2 and 3, the operation of the light modulator 10 in accordance with the invention is shown. Both FIGS. 2 and 3 show sectional views of light modulator 10 taken along line A—A in FIG. 1. When the light modulator 10 is in an unactivated state, that is, when switch 110 is open, the plurality of electrodes 50 are disposed in a first configuration wherein the plurality of electrodes 50 are coiled and arranged adjacent to the modulating region 80. When switch 110 is closed, the power source 100 applies a voltage between the plurality of electrodes 50 and the fixed electrode 30, electrostatically drawing the plurality of electrodes 50 towards the substrate and uncurling the plurality of electrodes 50 into a second flat configuration wherein the plurality of electrodes 50 are disposed substantially flatly onto the surface of the insulative transparent layer 40 for modulating light incident upon the modulating region 80. When the voltage from power source 100 is removed by opening switch 110, the intrinsic material stress of the plurality of electrodes 50 causes the plurality of electrodes 50 to return to the first configuration. The thickness of insulative transparent layer 40 is designed to be $p\lambda/n4$ so that the light reflected from the plurality of electrodes 50 disposed over the modulating region 80 in the second flat configuration has a phase relation of $p\lambda/2$ with light reflected from the fixed electrode 30, where p is an odd integer and n is the index of refraction of insulative transparent layer 40.

Figure 4:
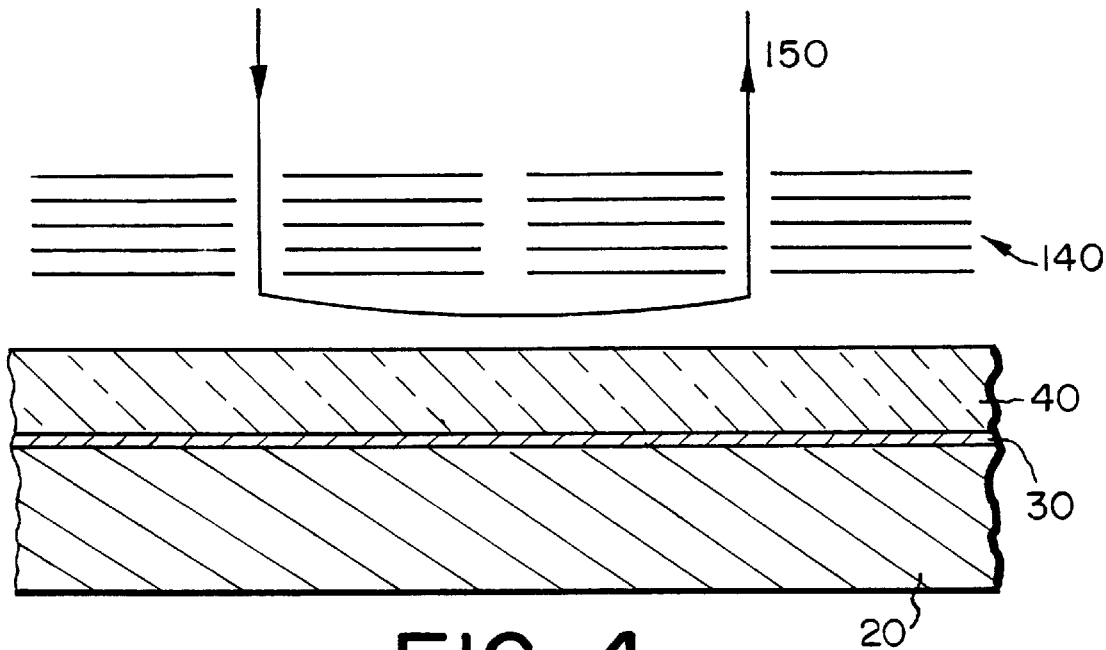
FIG. 4 is a sectional view of the modulator of FIG. 1 taken along line B—B of FIG. 1 wherein the plurality of electrodes are in a first configuration.

Referring to FIG. 4, a sectional view is shown of the modulator 10 taken along line B—B of FIG. 1, wherein the plurality of electrodes 50 are disposed in the first configuration, i.e., the switch 110 is open and the plurality of electrodes 50 are coiled and adjacent to the modulating region 80. Thus, when a lightwave 140 of wavelength $\lambda$ impinges perpendicularly to the surface of the modulator 10, the light passes through the insulative transparent layer 40, reflects from the fixed electrode 30, passes back through the insulative transparent layer 40, and the modulator 10 reflects light as a flat mirror as indicated by arrow 150.

Figure 5:
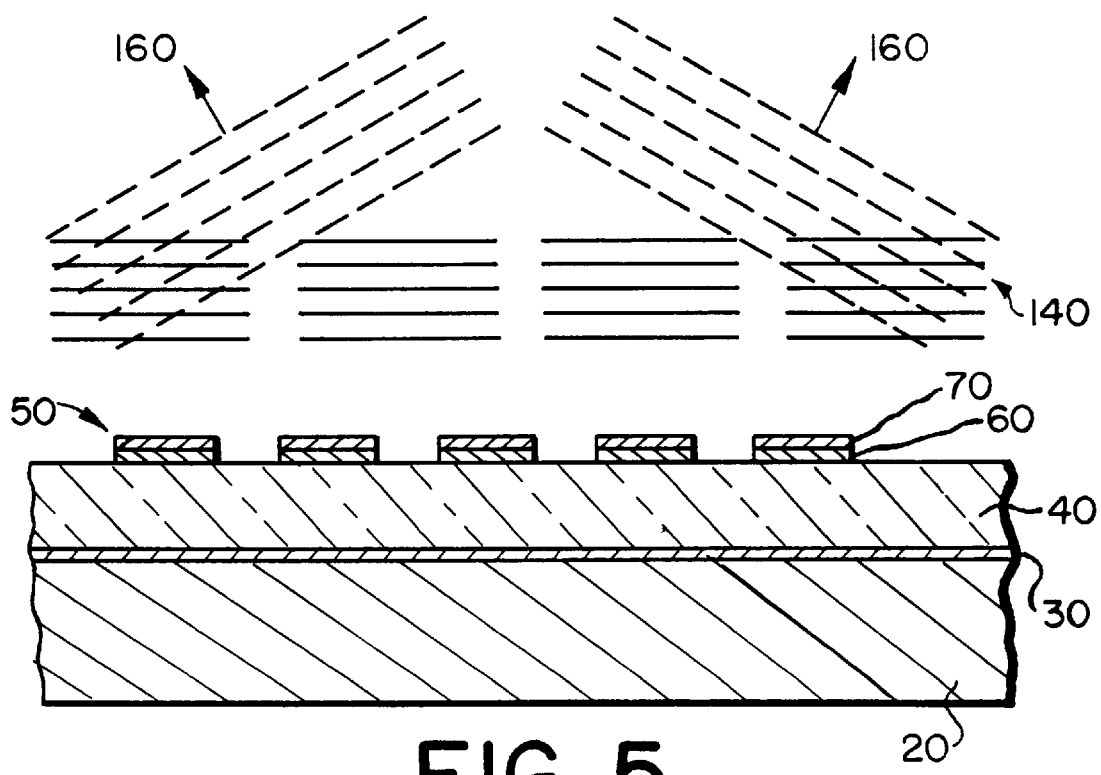
FIG. 5 is a sectional view of the modulator of FIG. 1 taken along line B—B of FIG. 1 wherein the plurality of electrodes are in a second flat configuration and the modulator diffracts incident light.

Referring to FIG. 5, a sectional view is shown of the modulator 10 taken along line B—B of FIG. 1, wherein the plurality of electrodes 50 are in the second flat configuration, i.e., the switch 110 is closed, the power source 100 imposes a voltage V between the plurality of electrodes 50 and the fixed electrode 30, and the plurality of electrodes 50 are disposed substantially flatly onto the top surface of insulative transparent layer 40 in the modulating region 80. When a lightwave 140 of wavelength $\lambda$ impinges perpendicularly to the surface of the modulator 10, the light reflected from the plurality of electrodes 50 is out of phase by $p\lambda/2$ and interferes with the light reflected from the fixed electrode 30. Thus, the modulator 10 acts substantially like a reflective phase grating and diffracts the incident light in directions indicated by arrows 160. This is because the optical path distance between the plurality of electrodes 50 and the fixed electrode 30 is $2n \times p\lambda/n4 = p\lambda/2$. Optical systems can be designed to intercept the diffracted light with output occurring only when the plurality of electrodes 50 are in the activated flat configuration. For display applications, a group of plurality of electrodes 50 can be simultaneously activated to form a pixel, and arrays of such pixels can be fabricated for displaying and image. Furthermore, the modulator 10 can be used for color applications by appropriately altering the pitch of the plurality of electrodes 50.

In a first embodiment the fixed electrode 30 is preferably formed from a conductive and reflective material selected from the group consisting of indium, tin, gold, silver, aluminum, platinum, silicon and tungsten. Referring to FIG. 2, in another embodiment each one of the plurality of electrodes 50 includes a first layer 60 and second layer 70, wherein the first layer 60 is nearer to the insulative transparent layer 40 and is under a compressive stress therein, and the second layer 70 is farther from the insulative transparent layer 40 and has a tensile stress therein. The second layer 70 of the plurality of electrodes 50 is a conductive and reflective material selected from the group consisting of indium, tin, gold, silver, aluminum, platinum, silicon and tungsten, and is electrically connected to a conductive pad 90 which is deposited on top of the layer of insulative transparent material 40. The conductive pad 90 is selected from the group consisting of indium, tin, gold, silver, aluminum, platinum, silicon and tungsten. The insulative transparent material 40 is selected from the group consisting of glass, silicon nitride, polymers and silicon dioxide.

In an alternative embodiment the plurality of electrodes can be composed of a single conductive reflective layer such as single layer 70 above and formed with a suitable intrinsic stress that renders it curled in an unactivated state. Alternatively, the plurality of electrodes 50 can be formed from any number of layers that render the same functionality.

It will be appreciated by those skilled in the art that the plurality of electrodes 50 can be corrugated as taught by Bozler et al so as to improve the device dynamics.

The invention has been described in detail with particular reference to certain preferred embodiments thereof, but it will be understood that variations and modifications can be effected within the spirit and scope of the invention.

Parts List
10 light modulator
20 substrate
30 fixed electrode
40 insulative transparent layer
50 plurality of electrodes
60 first layer
70 second layer
80 modulating region
90 conductive pad
100 power source

110 switch
140 incident light wave
150 direction arrow of reflected light
160 direction arrow of diffracted light

What is claimed is:

1. A light modulator for modulating a beam of light of wavelength λ comprising;
   (a) a substrate;
   (b) a fixed electrode formed over the substrate and arranged to reflect light;
   (c) an insulative transparent layer defining a modulating region formed over the fixed electrode wherein the height of the insulative transparent layer is substantially an odd multiple of λ/n4, where n is the index of refraction of the insulative transparent layer;
   (d) a plurality of electrodes having a coiled portion disposed adjacent to the modulating region and effective in a first configuration wherein the coiled portion remains coiled and in a second flat configuration in response to a voltage applied between the plurality of electrodes and the fixed electrode for uncoiling the coiled portion so that it is in the second flat configuration over the modulating region;
   (e) a top surface of the plurality of electrodes being made of a reflective material; and
   (f) means for applying a voltage across the plurality of electrodes and the fixed electrode to uncoil the coiled portion so that it is in the second flat configuration and its top surface is arranged to reflect light illuminating the modulating region so that light reflected from the top surface of the plurality of electrodes interferes with the light reflected from the fixed electrode to modulate the light which illuminates the light modulating region.

2. The light modulator of claim 1 wherein the plurality of electrodes includes a first layer disposed adjacent to the insulative transparent layer and a second reflective layer formed on the first layer for providing the top reflective surface, the second reflective layer having a greater tensile stress than the first layer so that the plurality of electrodes has the coiled portion in the first configuration.

3. The light modulator of claim 2 wherein either the first layer or the second reflective layer is formed of a conductive material and is adapted to be electrically connected to the voltage applying means.

4. The light modulator of claim 1 wherein the insulative transparent layer is formed of a material selected from the group consisting of glass, silicon nitride, polymers and silicon dioxide.

5. The light modulator of claim 1 wherein each one of the plurality of electrodes is coiled in a roll after formation and is anisotropically stressed in the direction where it uncoils to the second flat configuration.

6. The light modulator of claim 1 wherein the fixed electrode is formed of a layer of a material selected from the group consisting of indium, aluminum, tin, gold, silver, platinum, silicon and tungsten.

7. The light modulator of claim 1 wherein the first layer and the second layer of the plurality of electrodes are each formed of a material selected from the group consisting of indium, aluminum, tin, gold, silver, platinum, silicon and tungsten.

8. The light modulator of claim 1 wherein the plurality of electrodes are each formed from a single layer of material selected from the group consisting of indium, aluminum, tin, gold, silver, platinum, silicon and tungsten.

\* \* \* \* \*